(12) United States Patent
Putnam et al.

(10) Patent No.: US 11,536,374 B2
(45) Date of Patent: Dec. 27, 2022

(54) CLEANOUT CONDUIT VALVE ASSEMBLIES AND INSTALLATIONS

(71) Applicants: David A Putnam, Calhoun, LA (US); Steve E. Moore, Calhoun, LA (US)

(72) Inventors: David A Putnam, Calhoun, LA (US); Steve E. Moore, Calhoun, LA (US)

( * ) Notice: Subject to any disclaimer, the term of this patent is extended or adjusted under 35 U.S.C. 154(b) by 0 days.

(21) Appl. No.: 17/172,889

(22) Filed: Feb. 10, 2021

(65) Prior Publication Data
US 2022/0252159 A1 Aug. 11, 2022

(51) Int. Cl.
*F16K 1/20* (2006.01)
*F16K 15/18* (2006.01)
*F16K 15/03* (2006.01)
*E03F 7/04* (2006.01)
*E03F 9/00* (2006.01)

(52) U.S. Cl.
CPC .............. *F16K 1/2014* (2013.01); *E03F 9/00* (2013.01)

(58) Field of Classification Search
CPC ........ F16K 15/1821; F16K 15/03; E03F 7/04; E03F 9/00; Y10T 137/7902; F16L 55/115; F16L 55/1155
See application file for complete search history.

(56) References Cited

U.S. PATENT DOCUMENTS

| | | | | |
|---|---|---|---|---|
| 2,383,482 A | * | 8/1945 | Hirshstein | E03F 5/042 137/527.6 |
| 2,694,358 A | * | 11/1954 | Taylor | F01N 13/085 251/303 |
| 3,815,629 A | * | 6/1974 | Oberholtzer | F16K 15/03 137/527.8 |
| 4,495,859 A | * | 1/1985 | Janke | F01N 13/085 137/527.6 |
| 5,031,659 A | * | 7/1991 | Gonzales | F16K 15/03 137/527.6 |

FOREIGN PATENT DOCUMENTS

| | | | | | |
|---|---|---|---|---|---|
| GB | 2305712 A | * | 4/1997 | | E03F 7/04 |
| GB | 2393775 A | * | 4/2004 | | F16K 15/03 |

* cited by examiner

*Primary Examiner* — Marina A Tietjen
(74) *Attorney, Agent, or Firm* — R. Keith Harrison

(57) ABSTRACT

Cleanout conduit valve installations may include at least one cleanout housing having a cleanout housing interior and configured for placement in the cleanout conduit hole with the at least one cleanout conduit extending into the cleanout housing interior. A cleanout housing opening may overlie the cleanout housing interior. An openable cleanout housing door may be disposed in the cleanout housing opening. At least one cleanout conduit valve assembly may be configured to be disposed in fluid communication with the at least one cleanout conduit in the cleanout housing interior of the at least one cleanout housing. The at least one cleanout conduit valve assembly may include a valve housing configured for mounting on the at least one cleanout conduit. A valve mount may be carried by the valve housing. A valve may include a valve arm pivotally carried by the valve mount. A valve stop may extend from the valve arm. A valve body may be carried by the valve arm. The valve body may have a sealing surface. The valve may be positional between a closed valve position configured to seal the valve housing and a full open valve position configured to unseal the valve housing. The valve stop may engage the valve body in the full open valve position.

20 Claims, 17 Drawing Sheets

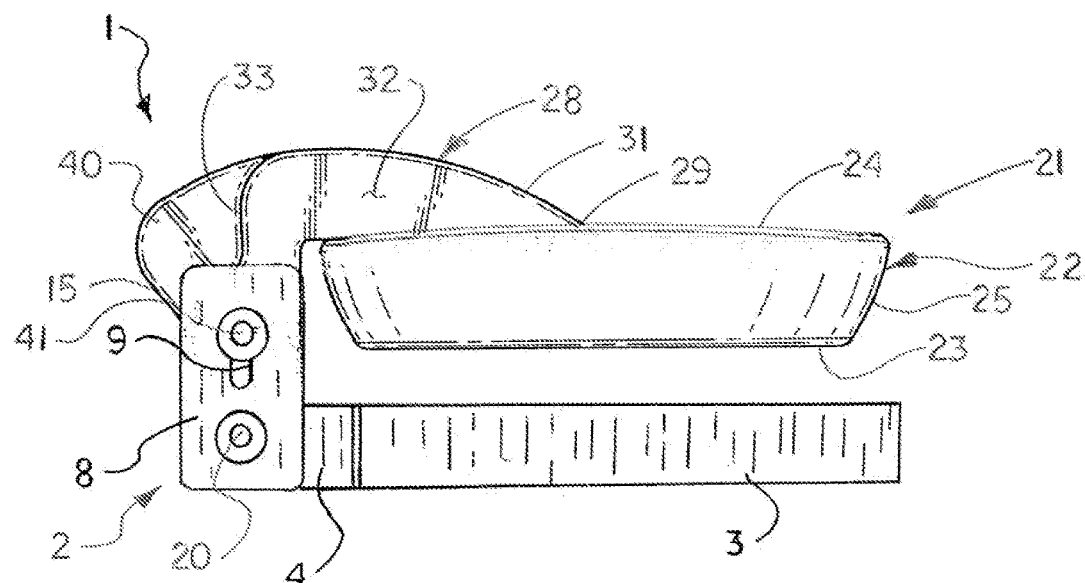
FIG. 3
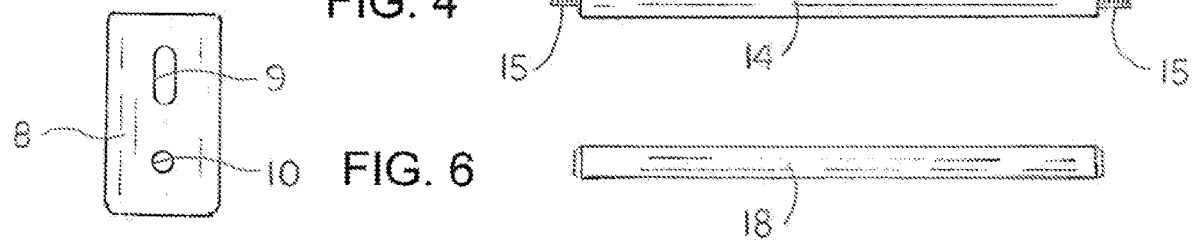
FIG. 4
FIG. 5    FIG. 6
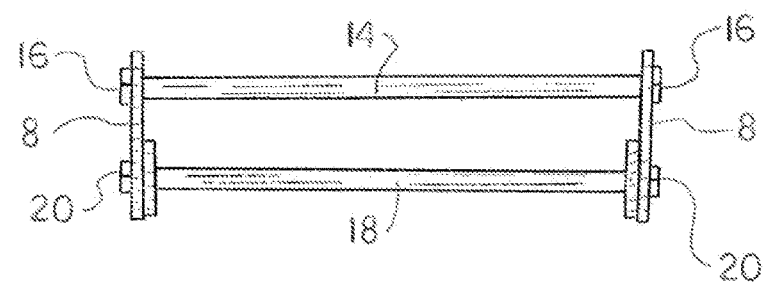
FIG. 7

CLEANOUT CONDUIT VALVE ASSEMBLIES AND INSTALLATIONS

FIELD

Illustrative embodiments of the disclosure generally relate to cleanout conduits for sewer service lines. More particularly, illustrative embodiments of the disclosure relate to cleanout conduit valve assemblies and installations which reliably prevent rainwater and other precipitation and runoff on a ground surface from entering a cleanout conduit connected to a sewer service line.

BACKGROUND

The background description provided herein is solely for the purpose of generally presenting the context of the illustrative embodiments of the disclosure. Aspects of the background description are neither expressly nor impliedly admitted as prior art against the claimed subject matter.

Homes, businesses and other buildings typically include a sewer service line which connects the sewage system of the building to a municipal sewer line. A cleanout conduit may extend from the sewer service line to facilitate cleaning and removal of clogs and debris from the sewer service line. The cleanout conduit may include a relief valve having a valve body. The valve body may normally be spring-loaded in a closed position to prevent entry of rainwater and other precipitation and runoff into the cleanout conduit and deployable to an open position. In the event of a blockage in the sewer service line between the cleanout conduit and the municipal sewer line, the open relief valve may facilitate overflow of sewage from the cleanout conduit to prevent backflow of the sewage through the cleanout conduit and sewer service line into the sewage system of the building.

A standard or conventional relief valve in a sewer service line has a discharge end which is oriented in a horizontal plane. The valve body is spring-loaded in the closed position to seal the discharge end. Responsive to flow of the overflow sewage from the cleanout conduit into the relief valve, the valve body opens to facilitate discharge of the overflow sewage. Upon termination of overflow sewage flow, the valve body returns to the closed position to prevent entry of precipitation and runoff into the relief valve and cleanout conduit.

One of the limitations of standard or conventional relief valves is that the horizontal orientation of the discharge end frequently causes paper and other debris to collect around the discharge end. Consequently, the valve body fails to close completely and inadequately seals the discharge opening at the discharge end. This may allow precipitation and runoff to enter the relief valve, potentially resulting in overflow of the relief valve onto the ground surface and potential entry of the overflow sewage into the building, particularly under heavy precipitation conditions.

Accordingly, cleanout conduit valve assemblies and installations which reliably prevent rainwater and other precipitation and runoff on a ground surface from entering a cleanout conduit connected to a sewer service line may be desirable for some applications.

SUMMARY

Illustrative embodiments of the disclosure are generally directed to cleanout conduit valve assemblies and installations for at least one cleanout conduit extending into a subterranean cleanout conduit hole and connected to a sewer service line. An illustrative embodiment of the cleanout conduit valve installations may include at least one cleanout housing having a cleanout housing interior and configured for placement in the cleanout conduit hole with the at least one cleanout conduit extending into the cleanout housing interior. A cleanout housing opening may overlie the cleanout housing interior. An openable cleanout housing door may be disposed in the cleanout housing opening.

At least one cleanout conduit valve assembly may be configured to be disposed in fluid communication with the at least one cleanout conduit in the cleanout housing interior of the at least one cleanout housing. The at least one cleanout conduit valve assembly may include a valve housing configured for mounting on the at least one cleanout conduit. A valve mount may be carried by the valve housing. A valve may include a valve arm pivotally carried by the valve mount. A valve stop may extend from the valve arm. A valve body may be carried by the valve arm. The valve body may have a sealing surface. The valve may be positional between a closed valve position configured to seal the valve housing and a full open valve position configured to unseal the valve housing. The valve stop may engage the valve body in the fill open valve position.

BRIEF DESCRIPTION OF THE DRAWINGS

Illustrative embodiments of the disclosure will now be described, by way of example, with reference to the accompanying drawings, in which:

FIG. 3 is a right-side view of the illustrative cleanout conduit valve assembly;

FIG. 4 is a front view of a typical valve mount rod of the valve mount;

FIG. 5 is a side view of a typical hinge plate of the valve mount;

FIG. 6 is a front view of a typical clamp mount rod of the valve mount;

FIG. 7 is a front view of the valve mount;

DETAILED DESCRIPTION

Figure 1:
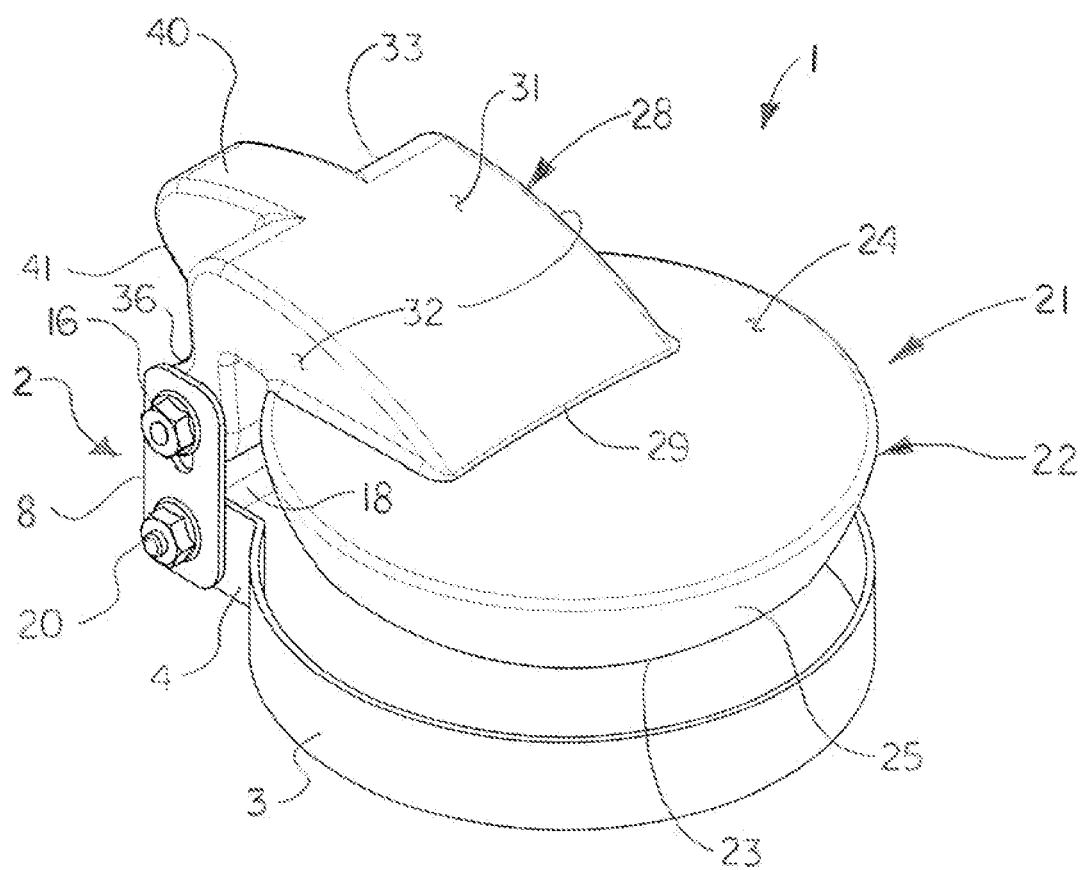
FIG. 1 is atop front perspective view of an illustrative embodiment of the cleanout conduit valve assemblies.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 24:
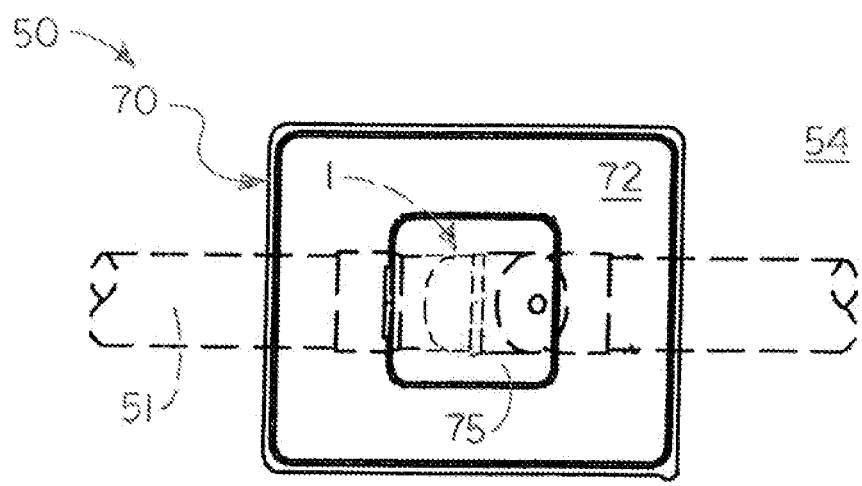
FIG. 24 is a top view of an illustrative embodiment of the cleanout conduit valve installations.
Figure 25:
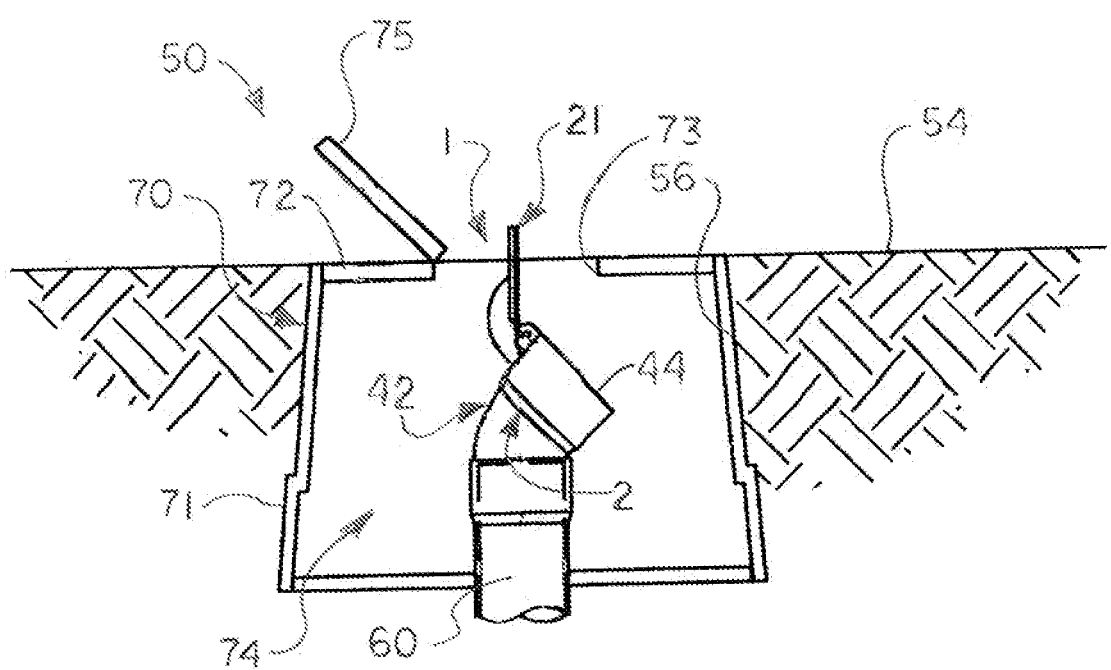
FIG. 25 is an interior view of the illustrative cleanout conduit valve installation illustrated in FIG. 24, with the valve of the cleanout conduit valve assembly in the open valve position on the valve housing in a cleanout housing of the cleanout conduit valve installation.
Figure 27:
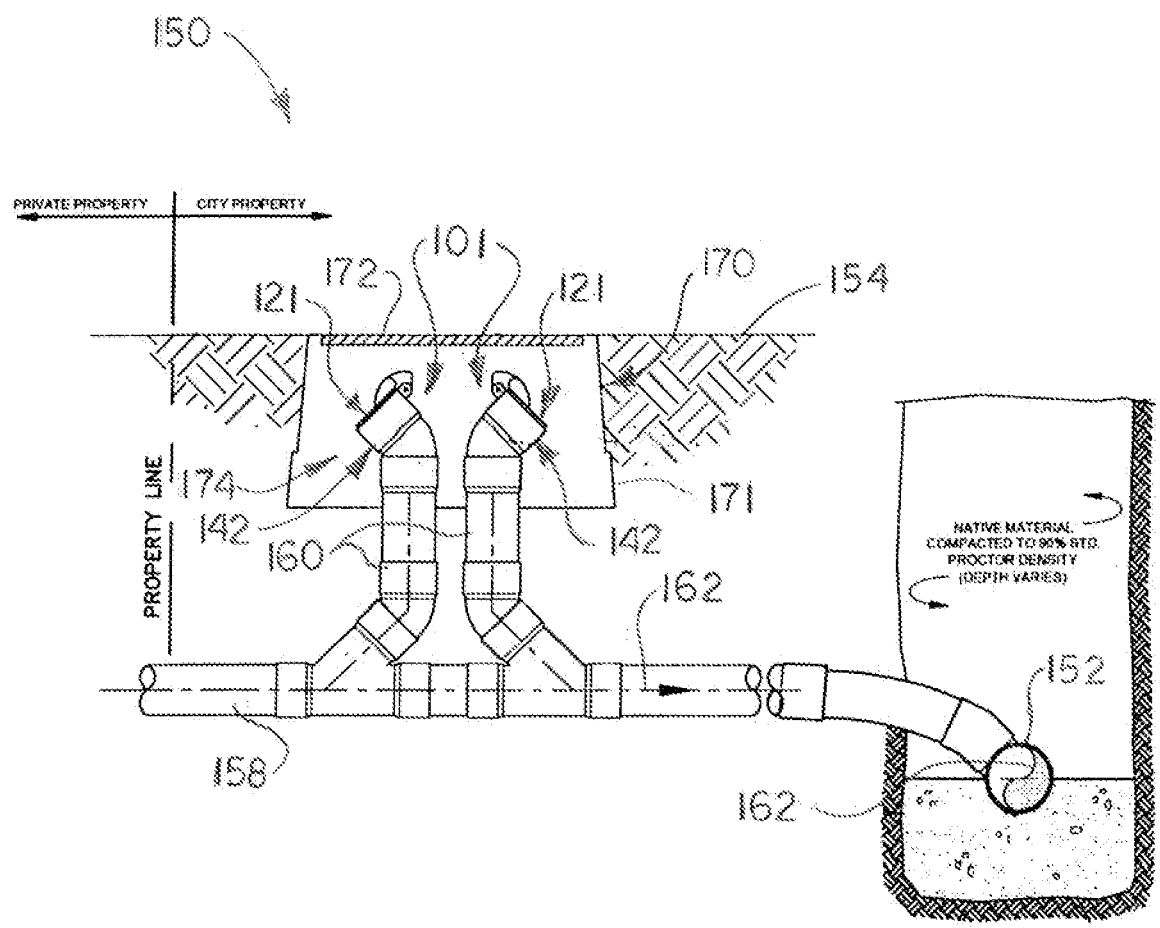
FIG. 27 is an interior view of an alternative illustrative cleanout conduit valve installation.

Referring initially to FIGS. 24 and 25 of the drawings, an illustrative embodiment of the cleanout conduit valve assemblies, hereinafter valve assembly, is generally indicated by reference numeral 1. As will be hereinafter further described, in typical application, the valve assembly 1 may be installed in a cleanout conduit valve installation 50 in fluid communication with respect to a cleanout conduit 60 (FIG. 25) connected to a sewer service line 51 (FIG. 24). The valve assembly 1 may prevent rainwater and other precipitation and runoff on a ground surface 54 from entering the cleanout conduit 60. The sewer service line 51 may connect the sewage system (not illustrated) of a home, office or other building (not illustrated) to a municipal sewer line 152 (FIG. 27). As illustrated in FIG. 25, in some applications, the cleanout conduit 60 may be oriented vertically in a cleanout housing interior 74 of a cleanout housing 70, situated in a subterranean cleanout conduit hole 56 which descends from the ground surface 54. The cleanout conduit 60 may facilitate periodic cleaning and removal of clogs and debris from the sewer service line 51, typically in the conventional manner.

In the event of a blockage (not illustrated) in the sewer service line 51 between the cleanout conduit 60 and the municipal sewer line 52, the valve assembly 1 may facilitate overflow of sewage from the cleanout conduit 60 typically into the housing interior 74 of the cleanout housing 70. The valve assembly 1 may thus prevent backflow of the sewage through the sewer service line 51 into the sewage system of the building. The valve assembly 1 may additionally maintain a liquid-tight seal on the cleanout conduit 60 to reliably prevent precipitation and runoff on the ground surface 54 from entering the cleanout conduit 60 and consequent overflow of sewage from the cleanout conduit 60 and the cleanout housing 70 onto the ground surface 54, particularly under heavy precipitation conditions. The valve assembly 1 may additionally prevent rats, snakes and other vermin from entering the cleanout conduit 60.

Figure 17:
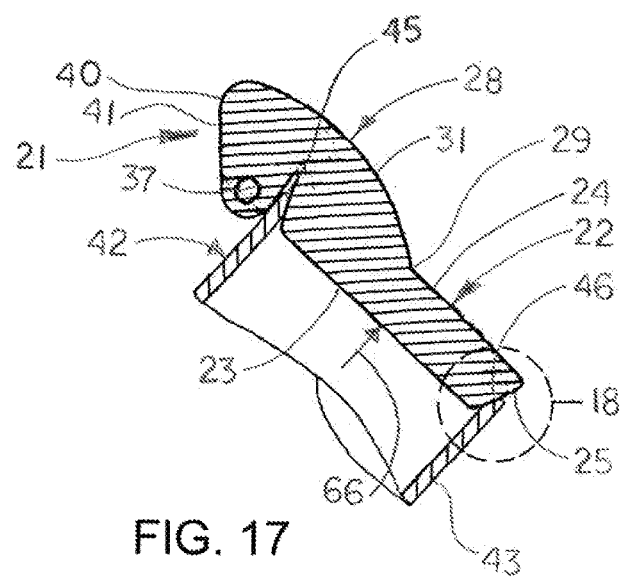
FIG. 17 is a cross-sectional view of the valve in a closed valve position on the valve housing.
Figure 18:
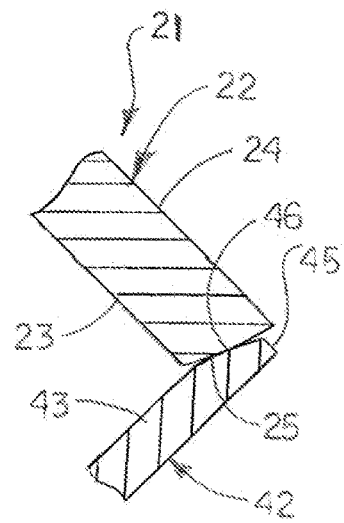
FIG. 18 is an enlarged sectional view, taken along section line 18 in FIG. 17, more particularly illustrating a typical convex or rounded sealing surface on the valve engaging a typical convex or rounded valve engaging surface on the valve housing wall of the valve housing.

Referring next to FIGS. 8 and 17-21 of the drawings, the valve assembly 1 may be configured for mounting on a vertically oriented valve housing 42 which is coupled to the cleanout conduit 60. In typical application of the valve assembly 1, the valve housing 42 may be generally oriented along a vertical axis 49 in the housing interior 74 (FIG. 25) of the cleanout housing 70. The valve housing 42 may include a valve housing wall 43 having a valve inlet end 44 and a valve discharge end 45 which is opposite to and generally above the valve inlet end 44. The valve inlet end 44 may be configured to be disposed in fluid communication with the cleanout conduit 60 typically via threading, molding and/or otherwise according to the knowledge of those skilled in the art. As illustrated in FIGS. 17-21, in some embodiments, the valve discharge end 45 of the valve housing 42 may have an interior valve engaging surface 46 which may be rounded or convex cross-section, as illustrated in FIG. 18, for purposes which will be hereinafter described.

Figure 8:
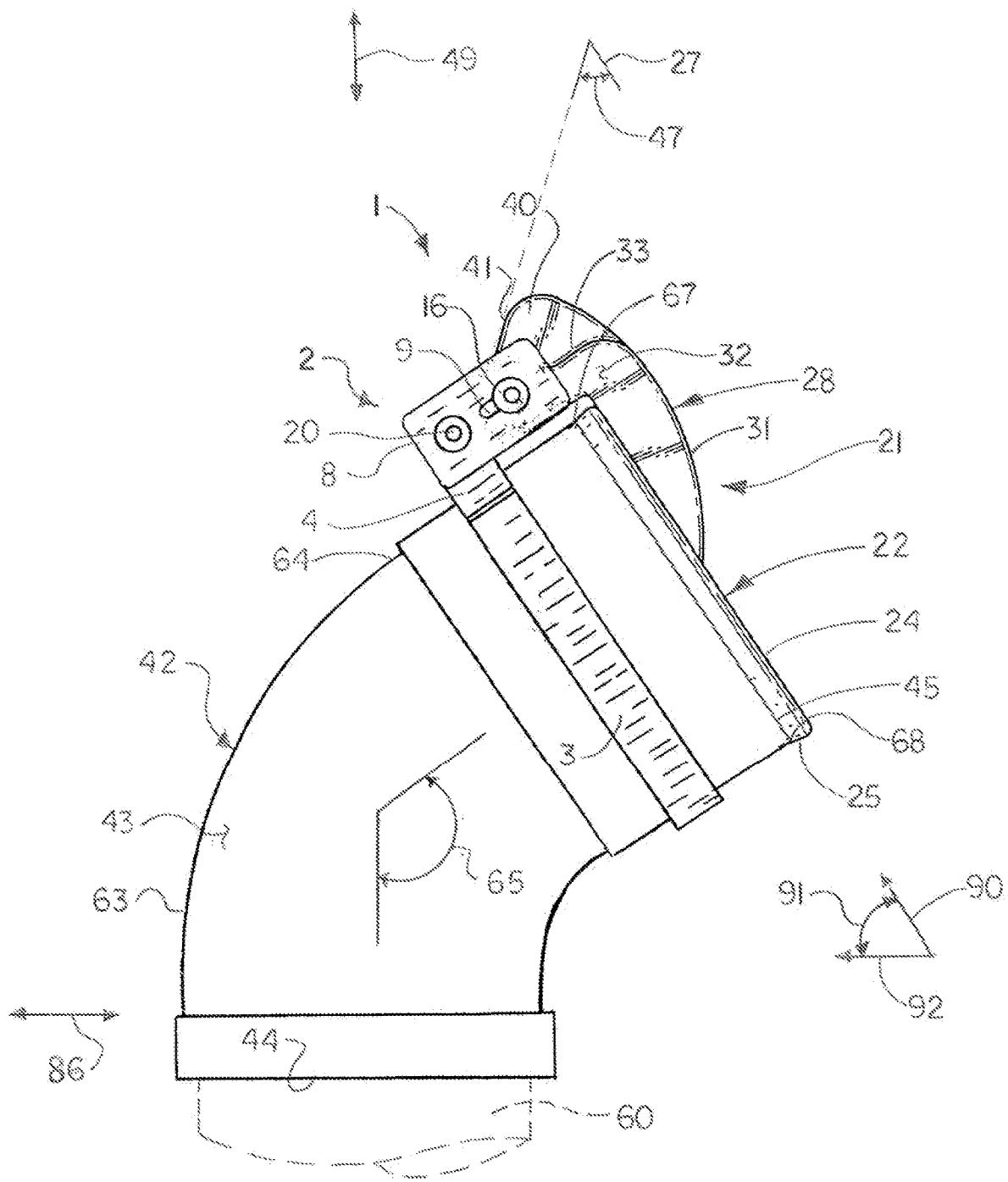
FIG. 8 is a right-side view of the illustrative cleanout conduit valve assembly, mounted on a valve housing coupled to a cleanout conduit (illustrated in phantom) in typical installation and application of the cleanout conduit valve assemblies.

As further illustrated in FIG. 8, in some applications or embodiments, the valve inlet end 44 of the valve housing 42 may be disposed within a horizontal valve inlet plane 86. The valve discharge end 45 of the valve housing 42 may have an upper discharge opening side 67 and a lower discharge opening side 68 which is sloped downwardly from the upper discharge opening side 67.

The valve discharge end 45 of the valve housing 42 may be oriented within a valve discharge plane 90 which may be disposed at a discharge angle 91 with respect to a horizontal plane 92. The discharge angle 91 of the valve discharge end 45 may be any angle which is greater than 0 degrees. Preferably, the discharge angle 91 is at least about 10 degrees. More preferably, the discharge angle 91 is from about 35 degrees to about 55 degrees. Most preferably, the discharge angle 91 is 45 degrees but may be as great as 90 or more degrees.

The valve housing wall 43 of the valve housing 42 may include an inlet housing segment 63. A discharge housing segment 64 may be disposed at an obtuse angle 65 to the inlet housing segment 63. Accordingly, the valve inlet end 44 may terminate the inlet housing segment 63, and the valve discharge end 45 may terminate the discharge housing segment 64 of the valve housing 42. A valve interior not illustrated) may extend from the valve inlet end 44 to the valve discharge end 45. In some embodiments, the valve housing wall 43 may include polyvinylchloride (PVC), although other materials may additionally or alternatively be used.

Referring next to FIGS. 1-21 of the drawings, the valve assembly 1 may include a valve mount 2. The valve mount 2 may be suitably configured for mounting the valve assembly 1 on the valve housing 42, typically as illustrated in FIG. 8. A valve 21 may be pivotally supported by the valve mount 2. As illustrated in FIGS. 17-21, the valve 21 may be positional between a closed valve position (FIG. 17) and an open valve position (FIG. 21) on the valve housing 42. As illustrated in FIG. 18, in the closed valve position, the valve 21 may rest on the valve engaging surface 46 at the valve discharge end 45 of the valve housing 42, typically entirely or solely ay the weight of the valve 21. The valve 21 may sealingly engage the valve discharge end 45 of the valve housing 42 to prevent influx of rainwater and other precipitation and runoff on the ground surface 54 (FIG. 25) from entering the cleanout conduit 60, typically as will be hereinafter describe.

In some circumstances, such as in the event of a blockage in the sewer service line 51 (FIG. 24), the valve 21 may deploy from the closed valve position to the open valve position typically responsive to flow of overflow sewage 98 (FIG. 19) from the cleanout conduit 60 through the valve housing 42. The overflow sewage 98 may open the valve body 21 typically against the influence of gravity to the open valve position, in which the valve 21 unseats from and unseals the valve discharge end 45 of the valve housing 42 typically as will be hereinafter described. In some embodiments, a spring or other closure assistance mechanism (not illustrated) may additionally facilitate or assist closure of the valve 21 against the valve discharge end 45.

Figure 2:
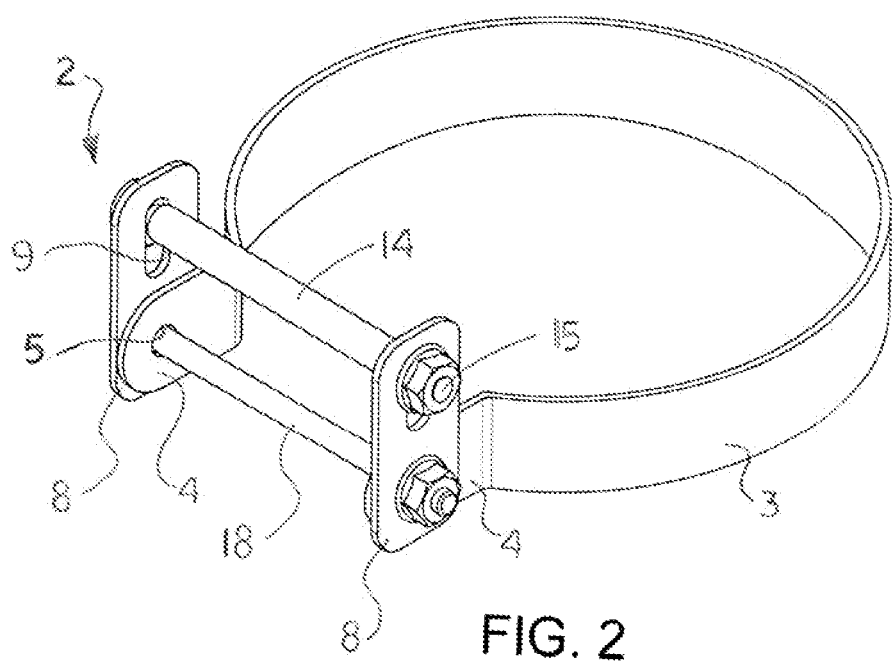
FIG. 2 is a top rear perspective view of a typical valve mount of the cleanout conduit valve assemblies.

The valve mount 2 may have any design which is suitable to facilitate mounting of the valve assembly 1 to the valve housing 42 at the valve discharge end 45. Accordingly, as illustrated in FIGS. 2 and 3, in some embodiments, the valve mount 2 may include a split clamp collar 3 which may be generally circular. A pair of spaced-apart clamp flanges 4 may terminate the opposite ends of the clamp collar 3. The clamp flanges 4 may be disposed in spaced-apart, parallel relationship to each other. The clamp collar 3 may include a flexible and at least partially deformable material such as a suitable metal, plastic and/or composite, for example and without limitation.

The valve mount 2 of the valve assembly 1 may include a pair of spaced-apart hinge plates 8 supported by the respective clamp flanges 4 of the clamp collar 3. The hinge plates 8 may be attached to the clamp flanges 4 using any technique which is suitable for the purpose. Accordingly, as illustrated in FIG. 5, in some embodiments, a collar mount aperture 10 may extend through each hinge plate 8. Each end of an elongated clamp mount rod 18 may extend through a flange opening 5 (FIG. 2) in each corresponding clamp collar flange 4 and through the registering collar mount aperture 10 (FIG. 5) in each corresponding hinge plate 8. As illustrated in FIGS. 3 and 7, a valve mount rod fastener 20 may engage each corresponding end of the clamp mount rod 18 to secure the clamp mount rod 18 between the hinge plates 8.

The valve 21 may be pivotally attached to the hinge plates 8 of the valve mount 2 using any technique which is suitable for the purpose. Accordingly, as further illustrated in FIG. 5, in some embodiments, a typically slotted valve mount aperture 9 may extend through each hinge plate 8, typically above the collar mount aperture 10. A threaded rod stud 15 on each end of an elongated valve mount rod 14 may extend through the registering valve mount aperture in each corresponding hinge plate 8. As illustrated in FIGS. 3 and 7, a valve mount rod fastener 16 may engage each corresponding threaded rod stud 15 on the valve mount rod 14 to secure the valve mount rod 14 between the hinge plates 8. In some embodiments, each valve mount rod fastener 16 may include a flange nut, for example and without limitation. The rod studs 15 on the valve mount rod 14 may prevent overtightening of the valve mount rod fasteners 16 or the valve fastener rod 16.

The valve 21 may pivotally interface with the valve mount rod 14 using any technique which is suitable for the purpose. Accordingly, as illustrated in FIGS. 9-12, a rod opening 37 may extend through the valve 21. The valve mount rod 14 may extend through the rod opening 37 to pivotally mount the valve 21 with respect to the valve mount rod 14. Accordingly, the valve mount rod 14 may define a pivot point of the valve 21 with respect to the hinge plates 8 of the valve mount 2.

As further illustrated in FIGS. 3 and 5, in some embodiments, the valve mount aperture 9 in each hinge plate 8 may be slotted or elongated. Accordingly, vertical the position of the valve 21 with respect to the hinge plates 8 may be adjusted as may be necessary to fit the valve body 22 (FIG. 8) in some applications. This may be accomplished by loosening the valve mount rod fasteners 16, adjusting the position of each rod stud 15 in each corresponding valve mount aperture 9 and tightening the valve mount rod fasteners 16, respectively.

As illustrated in FIGS. 8-16 of the drawings, the valve 21 of the valve assembly 1 may include a valve body 22. The valve body 22 may be circular with an interior valve body surface 23 and an exterior valve body surface 24, each of which may be flat or planar. In the closed valve position of the valve 21 on the valve housing 42, as illustrated in FIG. 8, the interior valve body surface 23 may face the interior of the valve housing 42.

Figure 11:
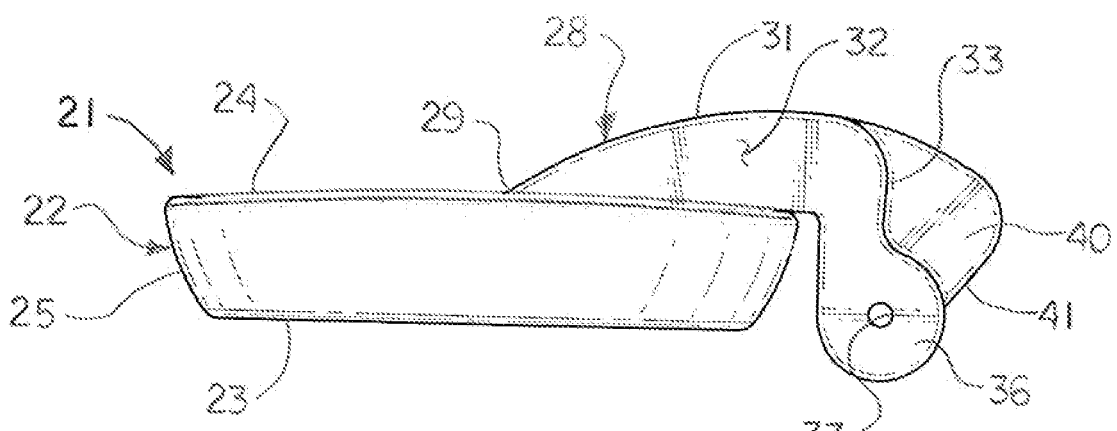
FIG. 11 is a typical left-side view of the valve.
Figure 12:
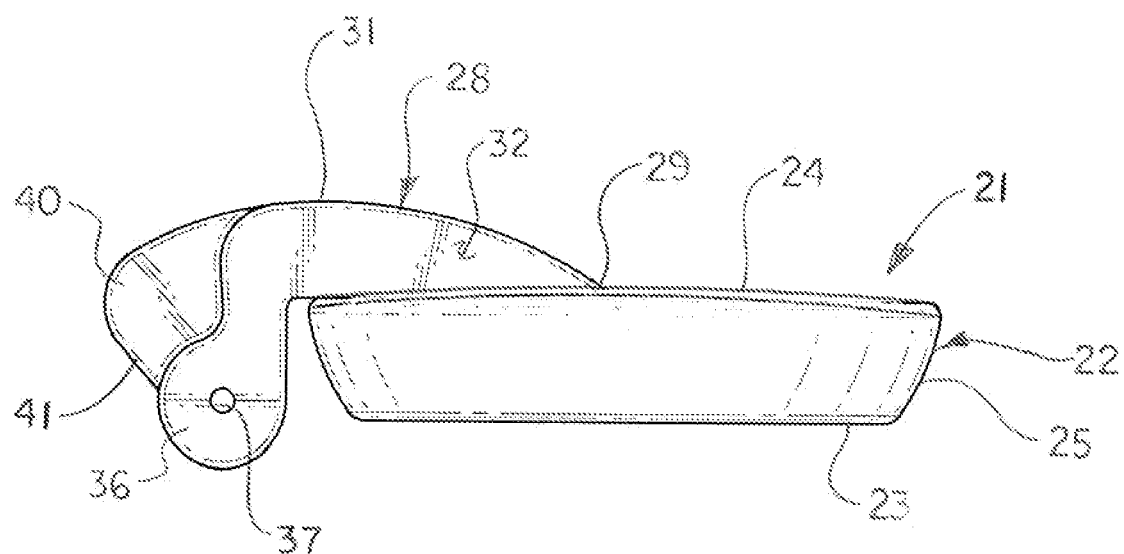
FIG. 12 is a typical right-side view of the valve.

The interior valve body surface 23 may have a width or diameter which is less than a width or diameter of the exterior valve body surface 24 of the valve body 22. Accordingly, a beveled sealing surface 25 may extend from the interior valve body surface 23 to the exterior valve body surface 24. As illustrated in FIGS. 11 and 12. in some embodiments, the sealing surface 25 may be rounded or convex in side-profile or cross-section for purposes which will be hereinafter described. In some embodiments, the exterior valve body surface 24 may be rounded or convex in cross-section typically for demolding draft purposes.

Figure 9:
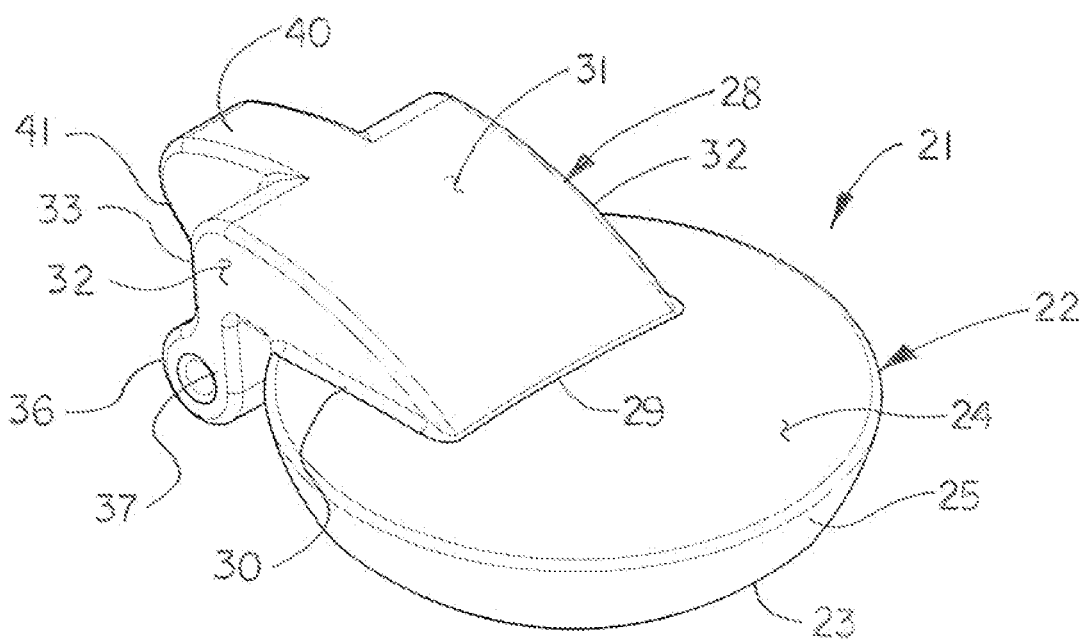
FIG. 9 is a top front perspective view of a typical valve of the illustrative cleanout conduit valve assembly.
Figure 10:
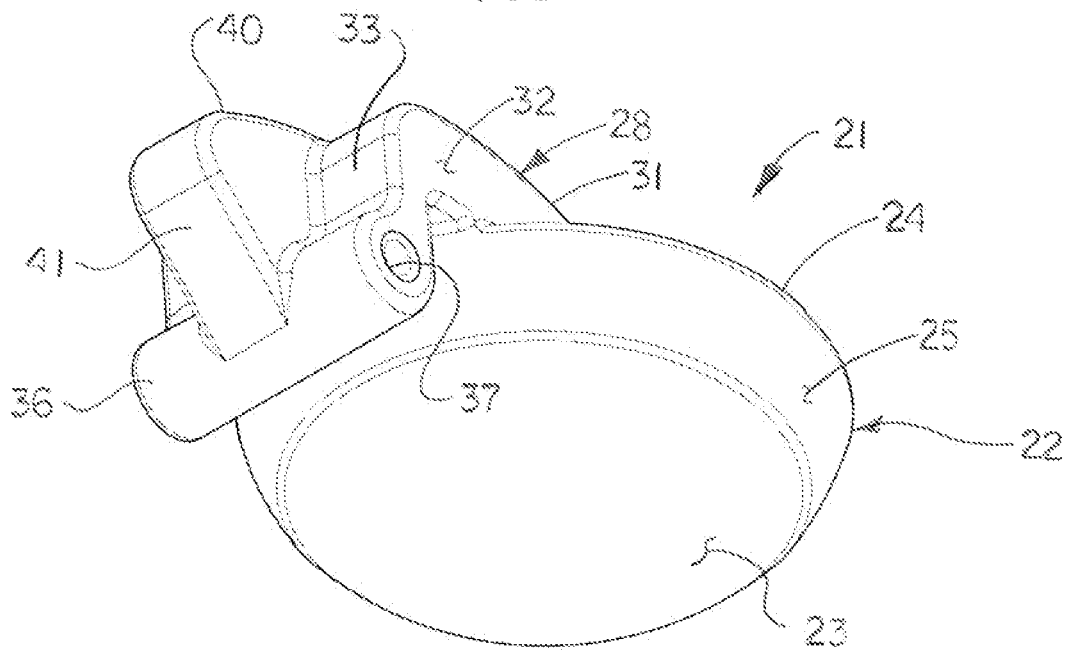
FIG. 10 is a bottom rear perspective view of the valve.
Figure 13:
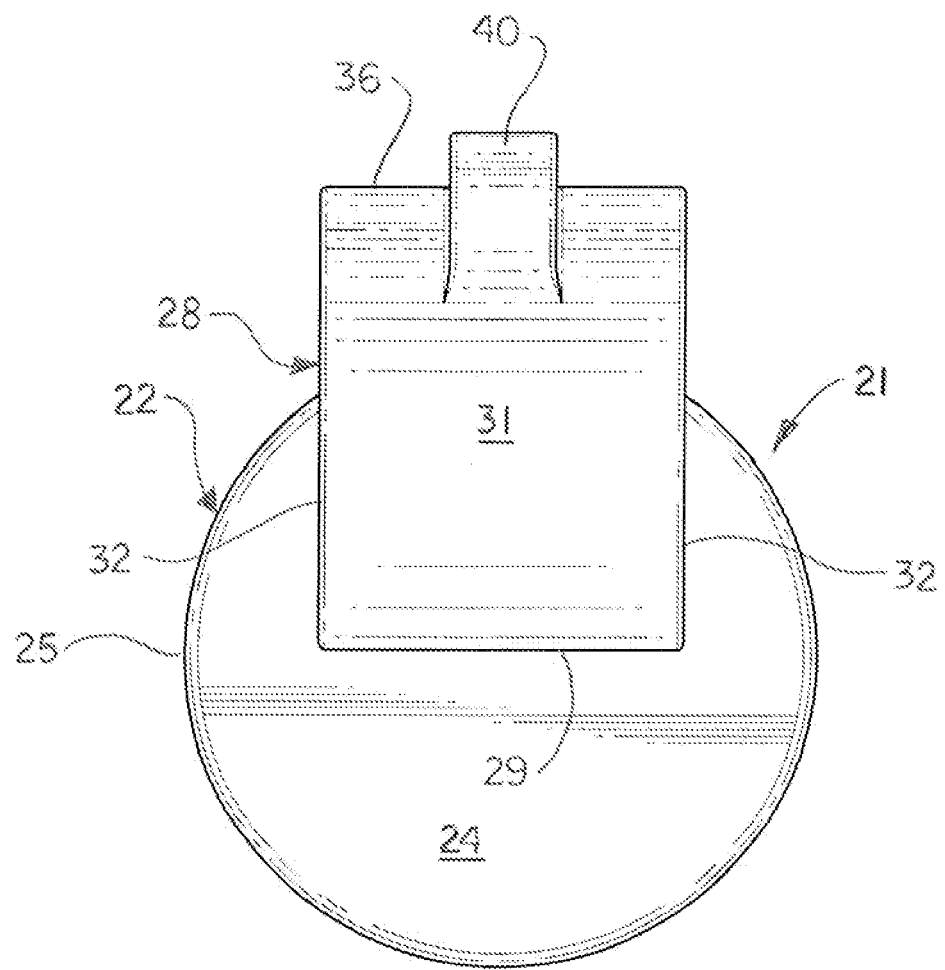
FIG. 13 is a typical top or exterior view of the valve.
Figure 14:
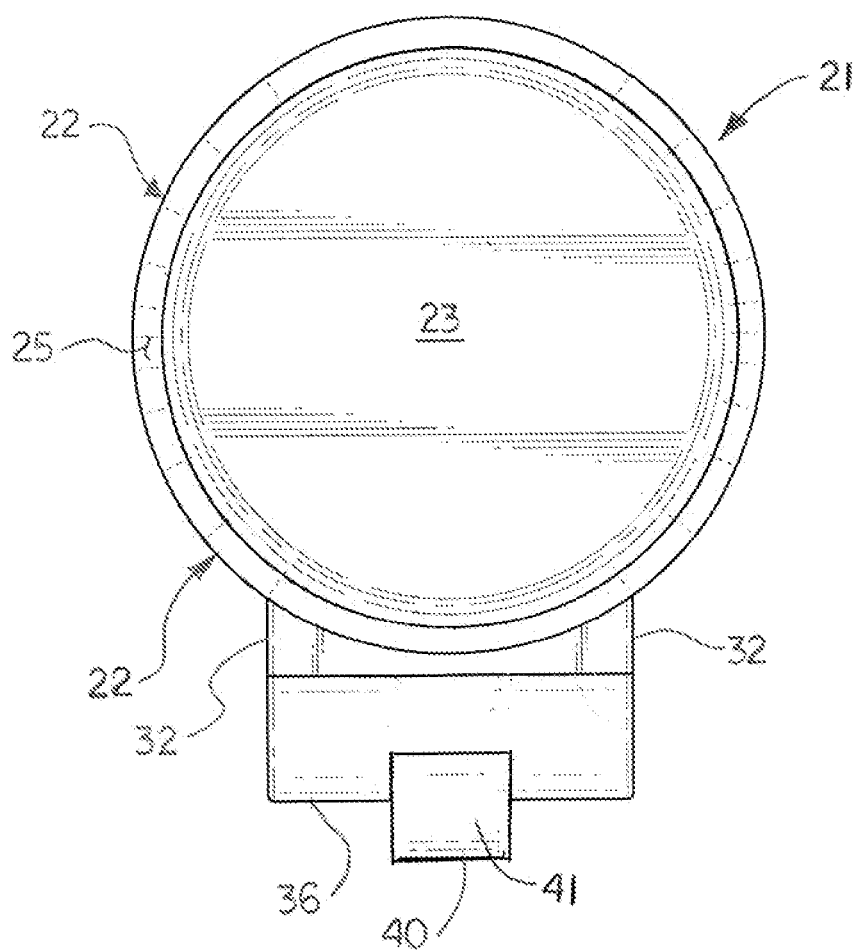
FIG. 14 is a typical bottom or interior view of the valve.
Figure 15:
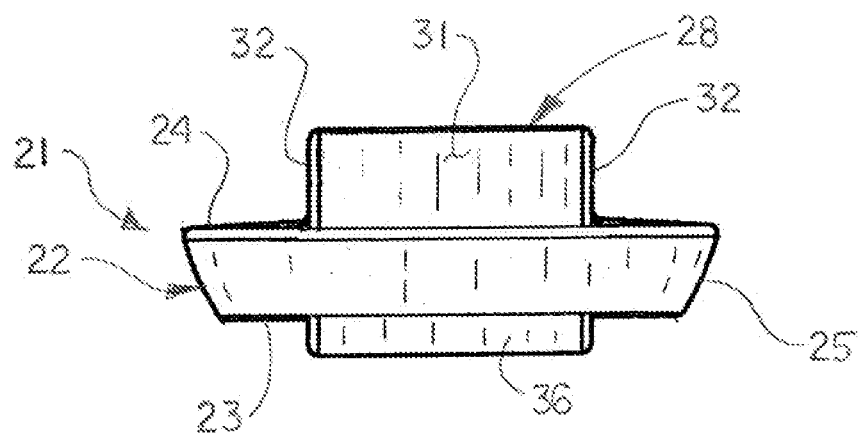
FIG. 15 is a typical front view of the valve.
Figure 16:
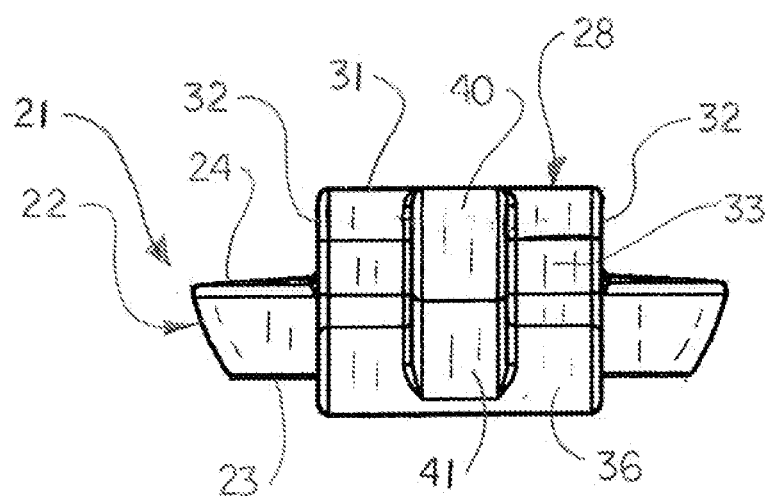
FIG. 16 is a typical rear view of the valve.

A valve arm 28 may extend from the valve body 22. As illustrated in FIGS. 9 and 13, the valve arm 28 may have a front arm edge 29 which extends along the exterior valve body surface 24 of the valve both 22. As illustrated in FIG. 9. a pair of parallel, spaced-apart side arm edges 30 (one of which is illustrated) may extend from the front arm edge 29. A pair of flat or planar side arm surfaces 32 may extend from the respective side arm edges 30. An upper arm surface 31 may slope from the front arm edge 29 along the side arm surfaces 32. The upper arm surface 31 may be convex typically for remolding drafting purposes. A rear arm surface 33 may extend downwardly from the upper arm surface 31.

A flanged valve stop 40 may extend from the rear arm surface 33 of the valve arm 28. The valve stop 40 may have a flat or planar valve stop surface 41. As illustrated in FIG. 8, in some embodiments, the valve stop surface 41 may be disposed at an acute stop angle 47 with respect to a valve body plane 27 of the valve body 22, typically for purposes which will be hereinafter described. The stop angle 47 may be 45 degrees, for example and without imitation.

A valve hinge portion 36 may extend from the valve arm 28 typically on opposite sides of the valve stop 40. The valve hinge portion 36 may be generally elongated and cylindrical and may substantially traverse the width of the valve arm 28. The rear arm surface 33 may extend from the upper arm surface 31 to the valve hinge portion 36. A rod opening 37 may traverse the valve hinge portion 36. Accordingly, the valve mount rod 14 (FIG. 2) of the valve mount 2 may extend through the rod opening 37 to pivotally mount the valve 21 to the valve mount 2. The diameter of the rod opening 37 relative to that of the valve mount rod 14 may be selected to ensure that resistance between the valve hinge portion 36 and the valve mount rod 14 is minimized as the valve 21 typically pivots relative to the valve mount rod 14.

The valve 21 of the valve assembly 1 may be fabricated of rubber, plastic and/or other resilient material known by those skilled in the art and may have a Shore hardness of about 60 Duro. In some embodiments, the valve body 22 may have a weight of at least about 1.0 lb.

Referring next to FIGS. 8 and 17-21 of the drawings, in typical installation of the valve assembly 1, the valve mount 2 may be fitted over the valve discharge end 45 of the valve housing 42 with the hinge plates 8 at the upper discharge opening side 67 of the valve discharge end 45 of the valve housing 42, as illustrated in FIG. 8. This may be accomplished by, for example and without limitation, initially loosening the clamp mount rod fasteners 20 on the respective ends of the clamp mount rod 18 (FIG. 2) to facilitate outward spread of the clamp flanges 4 on the lamp collar 3 of the valve mount 2 away from each other. In some embodiments, each clamp mount rod fastener 20 may include a flange nut, for example and without limitation. The clamp collar 3 may then be fitted over the valve housing 42, after which the clamp mount rod fasteners 20 may be retightened on the clamp mount rod 18 to move the clamp flanges 4 toward each other and tighten the clamp collar 3 around the valve housing 42. Accordingly, as illustrated in FIG. 17, the valve body 22 of the valve 21 may normally rest by gravity on the valve discharge end 45 of the valve housing 42 as the sealing surface 25 on the valve body 22 engages the valve engaging surface 46 on the valve housing wall 43 of the valve housing 42, as illustrated in FIG. 18. In some embodiments, the convex sealing surface 25 of the valve body 22 may engage the convex valve engaging surface 46 on the valve housing wall 43 to ensure a uniform seal around the circumference of the valve body 22 in circumstances in which the valve body 22 may become inadvertently misaligned with the valve discharge end 45 of the valve housing 42.

Figure 21:
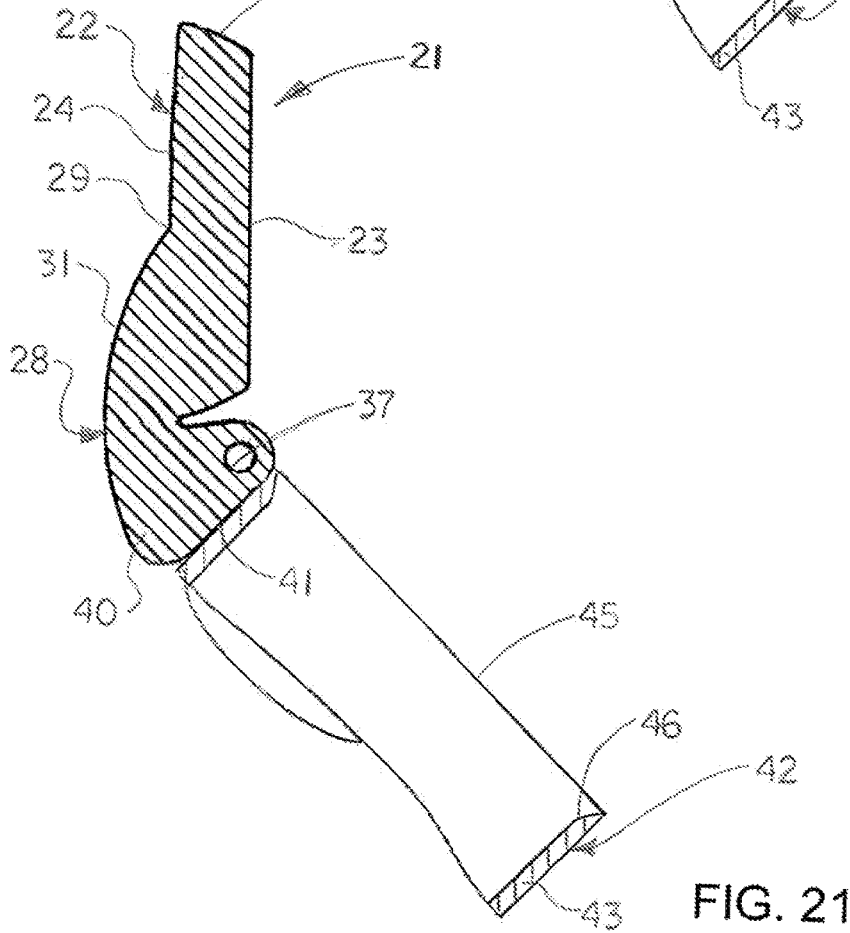
FIG. 21 is a cross-sectional view of the valve and valve housing, with the valve remaining in the full open valve position after the conditioning pressure is released from the valve.

As illustrated in FIG. 21, in the full open valve position of the valve 21, the valve stop surface 41 on the valve stop 40 of the valve 21 may engage the exterior surface of the valve housing wall 43 of the valve housing 42 to prevent the valve 21 from falling back away from the valve discharge end 45 of the valve housing 42. Accordingly, the valve body plane 27 of the valve body 22 may be oriented substantially vertically. It will be appreciated by those skilled in the art that the valve body 22 may have a valve center of mass 48 which is exterior, or toward the valve arm 28, with respect to the pivot point of the valve 21. This expedient may render the valve 21 self-standing in the typically vertical, full open valve position and prevent the valve 21 from inadvertently or prematurely failing back to the closed valve position (FIG. 17) on the valve housing 42.

Figure 20:
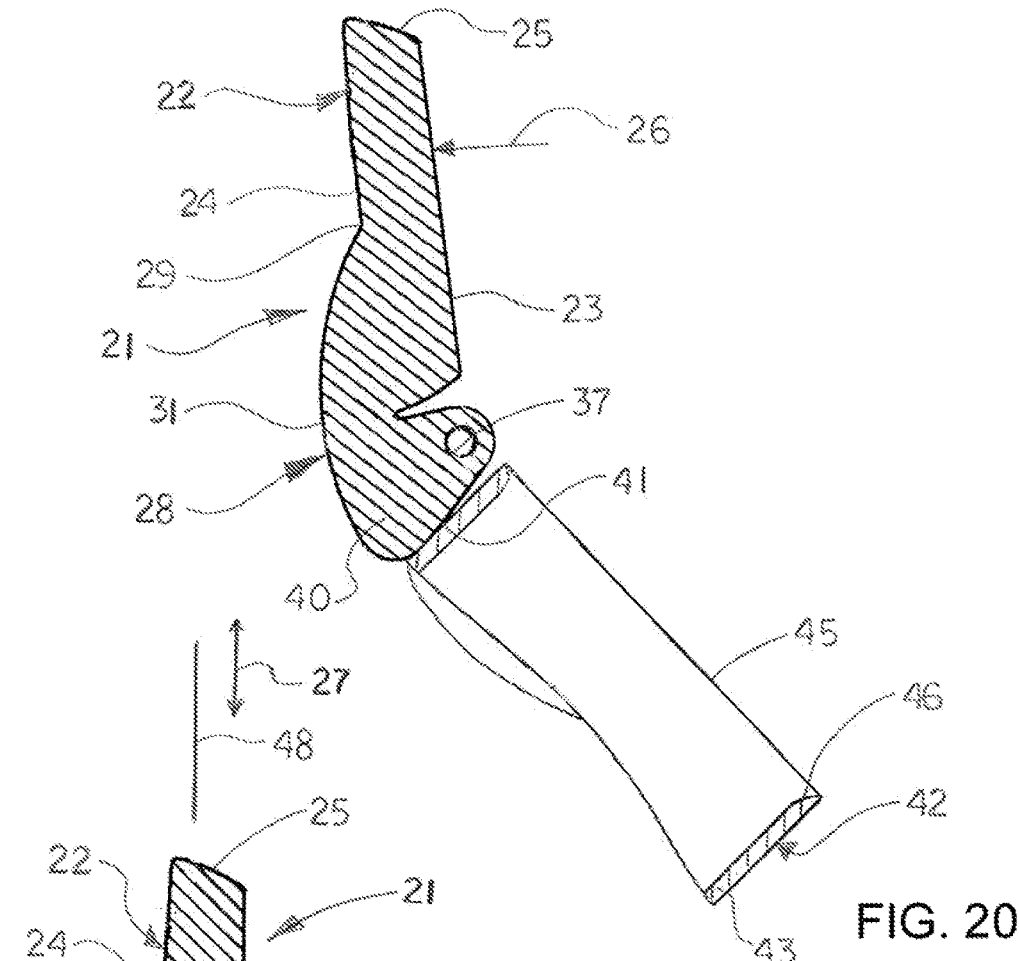
FIG. 20 is a cross-sectional view of the valve and valve housing, with the valve forced into a full open valve position by application of conditioning pressure against the valve and partial deformation of the valve body as a valve stop surface on an arm flange of the valve body engages the valve housing wall of the valve housing.

As illustrated ire FIG. 20, in some applications, the valve 21 may be conditioned by applying conditioning pressure 26 against the interior valve body surface 23 of the valve body 22. For example and without limitation, in some applications, the conditioning pressure 26 may have a magnitude of 3 N (0,67 lb.). Upon release of the conditioning pressure 26, the valve 21 may recoil and drop back to the closed valve position illustrated in FIG. 17.

Referring to FIGS. 17-21 and 24-26 of the drawings, in typical application, the cleanout conduit valve installation 50 may be installed beneath the ground surface 54, as illustrated in FIG. 25. Accordingly, the cleanout housing 70 may be installed in the cleanout conduit hole 56. The valve housing 42 may be installed on the cleanout conduit 60 in the cleanout housing interior 74 of the cleanout housing 70, such as via a threaded connection, for example and without limitation. The valve mount 2 of the valve assembly 1 may be mounted on the valve discharge end 45 of the valve housing 42, typically as was heretofore described with respect to FIG. 8.

As illustrated in FIG. 25, in some applications, the cleanout conduit 60 may extend from the sewer service line 51 (FIG. 24) in a vertical position or orientation into the cleanout housing interior 74 of the cleanout housing 70. The cleanout housing 70 may descend from the ground surface 54 in front of, behind, adjacent to or otherwise in the vicinity of the building (not illustrated) which is serviced by the sewer service line 51. The sewer service line 51 may connect the sewage system (not illustrated) of the building to the municipal sewer line 52 (FIG. 25). Accordingly, as illustrated in FIG. 27, raw sewage 62 may normally flow from the sewage system of the building through the sewer service line 51 to the municipal sewer line 52. The municipal sewer line 52 may convey the raw sewage 62 to a sewage treatment plant (not illustrated), typically in the conventional manner.

As further illustrated in FIG. 25, the cleanout conduit housing 70 may include a cleanout housing sidewall 71 and a cleanout housing top panel 72, forming the cleanout housing interior 74. A cleanout housing opening 73 which overlies the cleanout housing interior 74 may extend through the cleanout housing top panel 72. An openable cleanout housing door 75 may be pivotally attached to the cleanout housing top panel 72 for opening and closing of the cleanout housing opening 73. In installation of the cleanout housing 70 in the cleanout conduit hole 56, the cleanout housing top panel 72 and closed cleanout housing door 75 may be substantially even or coplanar with the ground surface 54. This expedient may enable lawnmowers and other lawncare equipment (not illustrated) to easily traverse or pass over the cleanout conduit installation 50.

Figure 26:
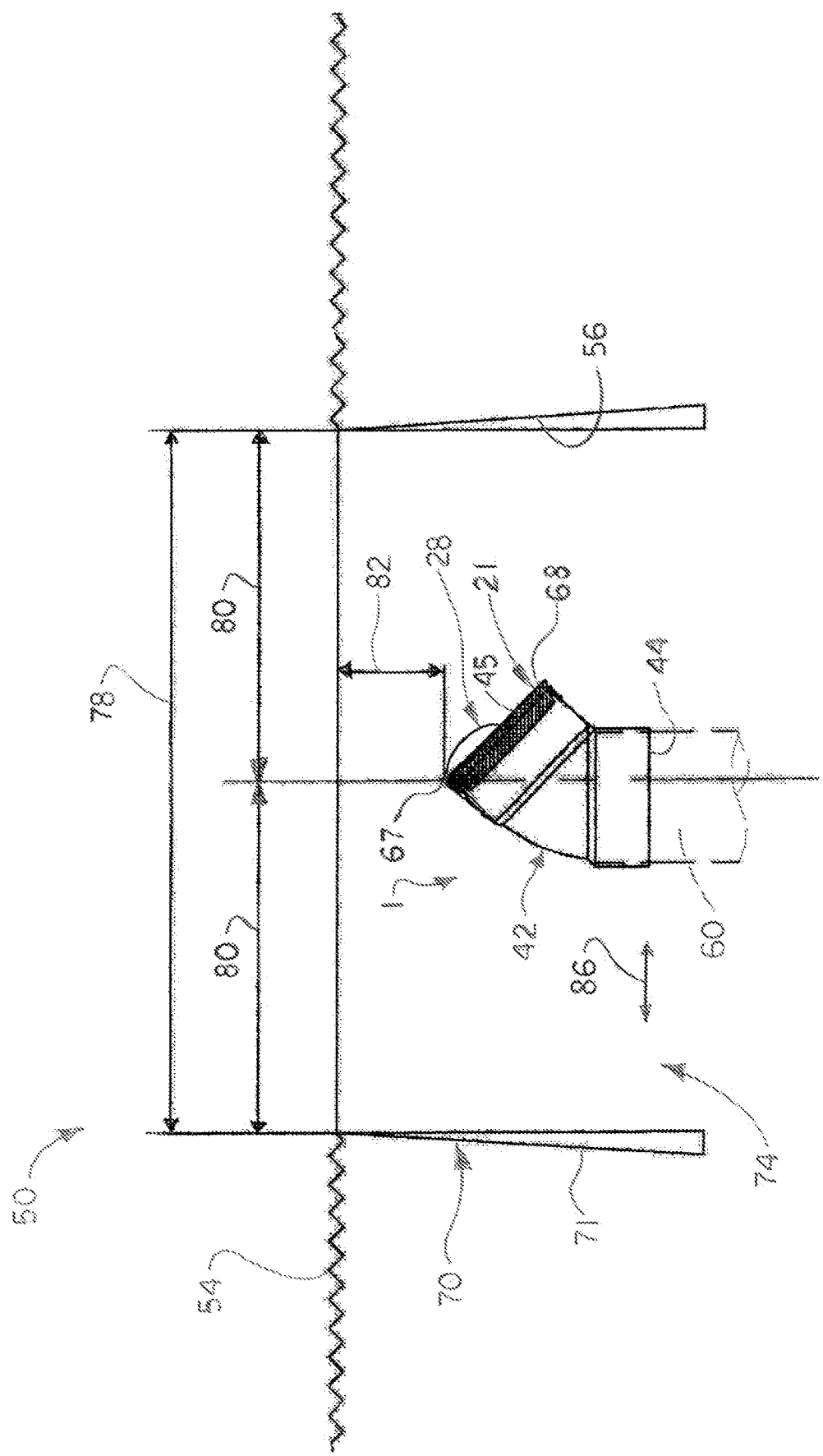
FIG. 26 is an interior view of the illustrative cleanout conduit valve installation with the valve of the cleanout conduit valve assembly in the closed valve position on the valve housing.

In some embodiments, the cleanout housing 70 may be an elongated, rectangular flip-cover valve box available from www.sewersentry.com. The depth of the valve assembly 1 in the cleanout housing interior 74 may be selected to require or ensure that the valve 21 is closed on the valve housing 42 before the cleanout housing door 75 can be closed in the cleanout housing opening 73. Accordingly, when the valve 21 is disposed in the closed valve position, as illustrated in FIG. 26, the cleanout housing door 75 (FIG. 25) may be deployed to close the cleanout housing opening 73 of the cleanout housing 70. Conversely, as illustrated in FIG. 25, when the valve 21 is in the full open valve position, the cleanout housing door 75 may be open with the valve body 22 of the valve 21 typically extending through the cleanout housing opening 73. Accordingly, the valve 21 typically must be retuned to the closed valve position on the valve body 22, as illustrated in FIG. 26, to facilitate closure of the cleanout housing door 75 of the cleanout housing 70.

As further illustrated in FIG. 26, in some embodiments of the cleanout conduit installation 50, the cleanout housing 70 may have a housing length 78 of 22.50 in. The upper discharge opening side 67 of the valve discharge end 45 on the valve housing 42 may be disposed at a center point distance 80 of about 11.25 inches from the respective ends of the cleanout housing 70. The upper discharge opening side 67 may be disposed at a valve depth 82 of typically from about 2 inches to about 3.50 inches from the ground surface 54. In other embodiments, these dimensions may vary.

As illustrated in FIGS. 17 and 18, gravity may normally maintain the valve body 22 in the seated and sealing, closed position against the valve engaging surface 46 at the valve discharge end 45 of the valve housing 42. Accordingly, in the event of precipitation (not illustrated) or runoff of precipitation from the ground surface 54, the valve body 22 normally prevents entry of the precipitation and/or precipitation runoff through the valve housing 42 and into the cleanout conduit 60 such that the precipitation and/or runoff may fall instead into the cleanout housing interior 74 of the cleanout housing 70. Under heavy precipitation conditions, the precipitation may fill and overflow the cleanout housing interior 74 and spill out onto the ground surface 54. However, the valve body 22 typically remains closed in the sealed position against the valve discharge end 45 of the valve housing 42 and continues to prevent entry of the rising precipitation into the cleanout conduit 60 through the valve housing 42. This expedient may prevent overflow sewage 98 (FIG. 19) from rising in the cleanout conduit 60 due to the entry of the precipitation and potentially overflowing the valve assembly 1, filling the cleanout conduit housing 70 and potentially flooding the ground surface 54.

Figure 19:
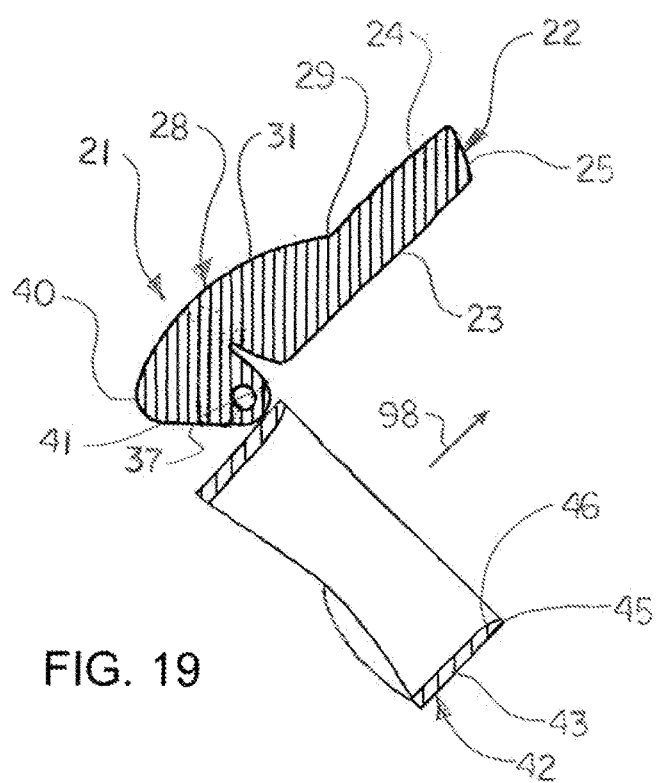
FIG. 19 is a cross-sectional view of the valve in a partial open valve position on the valve housing.

In the event that a clog or blockage (not illustrated) obstructs the sewer service line 51 between the cleanout conduit 60 and the municipal service line 52, the raw sewage 62 may backflow in the sewer service line 51. Accordingly, the overflow sewage 64 may flow from the sewer service line 51 into the cleanout conduit 60 and through the valve housing 42, lifting and unseating the valve body 22 from the valve discharge end 45 of the valve housing 42, as illustrated in FIG. 19, and flowing typically into the cleanout housing interior 74. The raw sewage 62 may subsequently be pumped or otherwise removed from the cleanout housing interior 74. The clog or blockage may be removed from the sewer service line 51 using conventional methods and techniques.

As illustrated in FIG. 25, the valve depth 82 (FIG. 26) of the valve assembly 1 in the cleanout housing interior 74 of the cleanout housing 70 may be selected such that the valve 21, in the fully open valve position, extends through the open cleanout housing opening 73 in the cleanout housing top panel 72 of the cleanout housing 70. This expedient may facilitate ease in removing the valve mount 2 from the valve housing 42 for repair, maintenance, or replacement. Moreover, the valve depth 82 may ensure that the valve assembly 1 is disposed at a sufficient height in the cleanout housing interior 74 to minimize the possibility that the overflow sewage 98 submerges the valve assembly 1 in the cleanout housing interior 74.

After flow of the raw sewage 62 through the sewer service line 51 is reestablished, the valve body 22 may subsequently close and seat against the valve discharge end 45, as illustrated in FIGS. 17 and 18, sealing the valve housing 42 and continuing to prevent flow of precipitation and runoff into the cleanout conduit 60 and sewer service line 51. Under heavy precipitation conditions, water may fill the cleanout housing interior 74, and the weight of the water may exert a downward force on the valve body 22. Accordingly, due to the angled or sloped orientation of the valve body 22 on the valve housing 42, less flow pressure 66 (FIG. 17) of the overflow sewage 98 in the cleanout conduit 60 is required to open the valve body 22 than is the case with standard or conventional cleanout conduit relief valves having a valve body with a horizontal orientation.

It will be appreciated by those skilled in the art that the valve assembly 1 reliably prevents rainwater and other precipitation and runoff on the ground surface 54, as well as rats, snakes and other vermin, from entering the cleanout conduit 60. This expedient prevents precipitation and runoff from otherwise entering the sewer service line 51 and rising through the cleanout conduit 60, overflowing the valve assembly 1 and potentially flooding the cleanout housing interior 74 and the ground surface 54.

Referring again to FIG. 8, it has been found that orienting the valve discharge end 45 of the valve housing 42 at the discharge angle 91 relative to the horizontal plane 92 and closing the valve body 22 under the influence of gravity prevents paper and other debris from collecting around and clogging the valve discharge end 45 and interfering with the valve mount 2 and otherwise preventing the valve body 22 from completely closing against and uniformly sealing the valve discharge end 45. Instead, any paper tends to collect toward the lower discharge opening side 68 of the valve discharge end 45 under the influence of gravity such that the beveled sealing surface 25 of the valve body 22 is capable of uniformly engaging and forming a liquid-tight seal with the valve discharge end 45. Moreover, it has been found that the weight of the valve body 22, in combination with the beveled orientation of the valve discharge end 45 and the weight of water pressure against the valve body 22, frequently enables the valve body 22 to cut through the collected paper and establish and maintain a uniform and consistent seal. This ensures uniform integrity of the liquid-tight seal between the sealing surface 25 and the valve discharge end 45 and prevents the precipitation and runoff from entering the cleanout conduit 60 and causing the overflow sewage 64 to rise in the cleanout conduit 60 to potentially overflow the cleanout housing interior 74 and the ground surface 54.

It will be further appreciated by those skilled in the art that, due to the design of the valve mount 2, the substantially the only resistance to opening of the valve 21 on the valve housing 42 us the weight of the valve 21. Accordingly, due to this and the angled or sloped orientation of the valve body 22 on the valve housing 42, less flow pressure 66 (FIG. 17) of the overflow sewage 64 in the cleanout conduit 60 is required to open the valve body 22 than is the case with standard or conventional cleanout conduit relief valves having a valve body with a horizontal orientation. Thus, the valve body 22 is capable of opening against the weight of water which may fil the cleanout conduit hole 56 under heavy precipitation conditions such that the flow pressure 66 of the overflow sewage 64 in the cleanout conduit 60 can more easily open the valve body 22 against the weight of the water. The overflow sewage 64 can thus discharge from the valve discharge end 45, thereby preventing the overflow sewage 64 from backing up in the sewer service line 51 into the building.

It will be further appreciated by those skilled in the art that, due to the typically slotted valve mount apertures 9 in the respective hinge plates 8, each end of the valve mount rod 14 of the valve mount 2 may be able to shift vertically within the corresponding valve mount aperture 9 to tilt the orientation of the valve mount rod 14 and the valve 21. This expedient, along with the typically convex cross-sectional contours of the sealing surface 25 on the valve body 22 and the valve engaging surface 46 on the valve housing 42, respectively, may enable the sealing surface 25 on the valve body 22 of the valve 21 to engage and maintain a uniform and consistent seal around the entire valve engaging surface 46 (FIG. 18) at the valve discharge end 45 of the valve housing 42 irrespective of the position of the valve body 22 on the valve housing 42. This may be advantageous under circumstances in which debris (not illustrated) collects or becomes trapped between the valve housing wall 43 and the valve body 22 on one side but not the other of the valve discharge end 45. In that case, the valve mount rod 14 may tilt with respect to the hinge plates 8 such that the valve body 22 unevenly engages the valve engaging surface 46 on opposite sides of the valve discharge end 45, while the sealing surface 25 maintains a uniform and consistent seal with the valve engaging surface 46 around the entire circumference of the valve discharge end 45.

Figure 28:
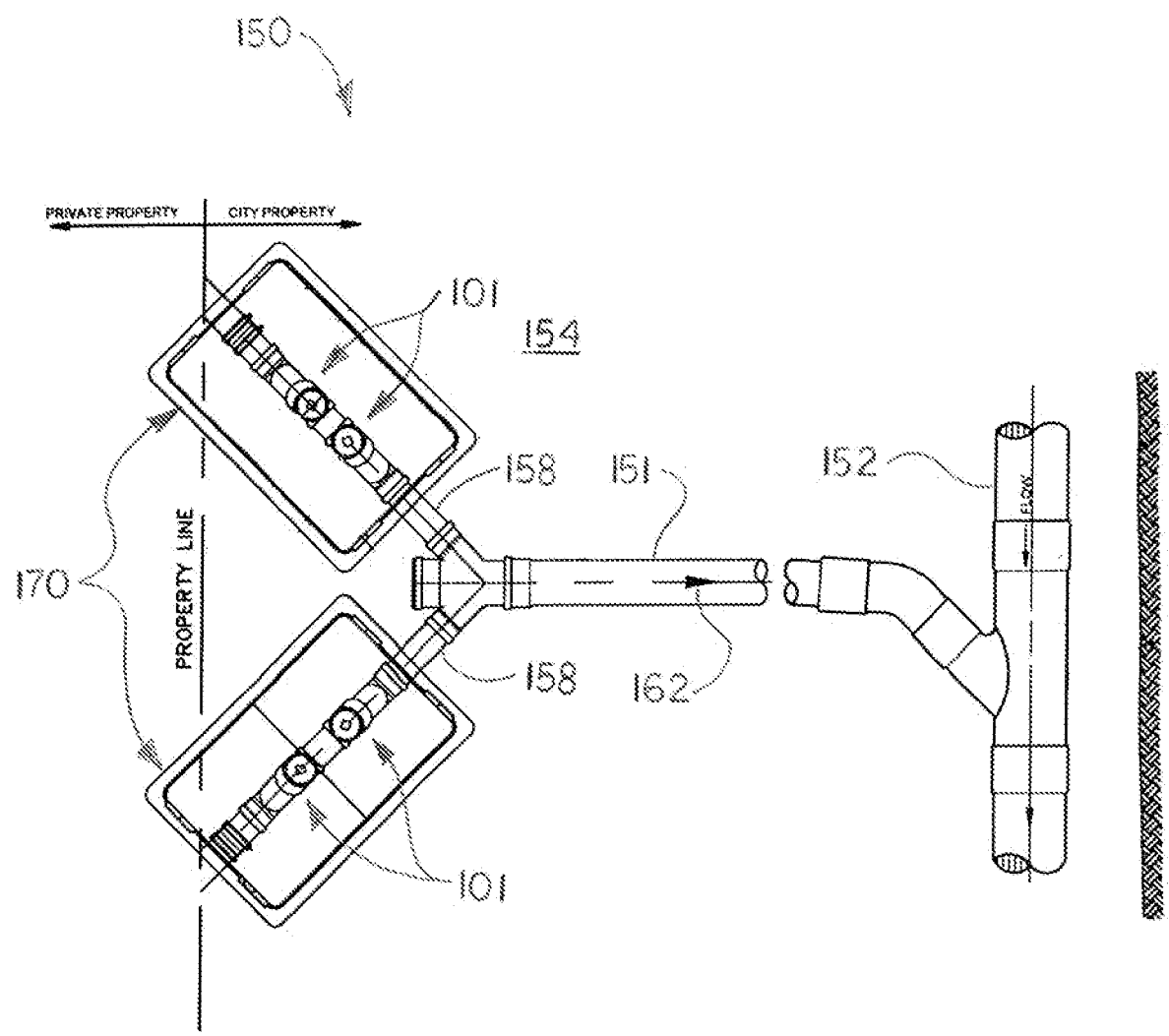
FIG. 28 is a top view of the cleanout conduit valve installation illustrated in FIG. 27.

Referring next to FIGS. 27 and 28 of the drawings, an illustrative embodiment of an alternative, two-way cleanout conduit valve installation is generally indicated by reference numeral 150. In the two-way cleanout conduit valve installation 150, elements which are analogous to the respective elements of the cleanout conduit valve installation 50 that was heretofore described with respect to FIGS. 24-26 are designated by the same respective numerals in the 150-200 series in FIGS. 27 and 28. The two-way cleanout conduit valve installation 150 may be suitable for installation in non-traffic areas, for example and without limitation.

As illustrated in FIG. 28, a pair of service line branches 158 may branch from a main sewer service line 151 which extends from the municipal sewer line 152. As illustrated in FIG. 27, at least one, and typically, two cleanout conduits 160 may extend in series from each service line branch 158 in parallel, adjacent relationship to each other. As illustrated in FIG. 28, the two-way cleanout conduit valve installation 150 may include a pair of cleanout housings 170, with the cleanout conduits 160 extending from each service line branch 158 into the cleanout housing interior 174 of each corresponding cleanout housing 170.

As illustrated in FIG. 27, a pair of valve housings 142 may be provided on the respective cleanout conduits 160 in the cleanout housing interior 174 of each cleanout housing 170, typically as was heretofore described with respect to the valve housing 1 in FIG. 8. The valve housings 142 may be angled away from each other, with the valve assemblies 101 typically facing away from each other in the cleanout housing interior 174.

Application of the two-way cleanout conduit valve installation 150 may be as was heretofore described with respect to the cleanout conduit valve installation 50 in FIGS. 25 and 26. In the event that a blockage forms in the sewer service line 151 or in one or both of the service line branches 158, overflow sewage 98 (FIG. 19) may overflow from one or both of the service line branches 158 through the valve assemblies 101 and in opposite directions into the cleanout housing interior 174 of the corresponding cleanout housing 170. Corrective measures may be made to repair or remove the blockage and pump the overflow sewage 98 from the cleanout housing interior 174.

Figure 22:
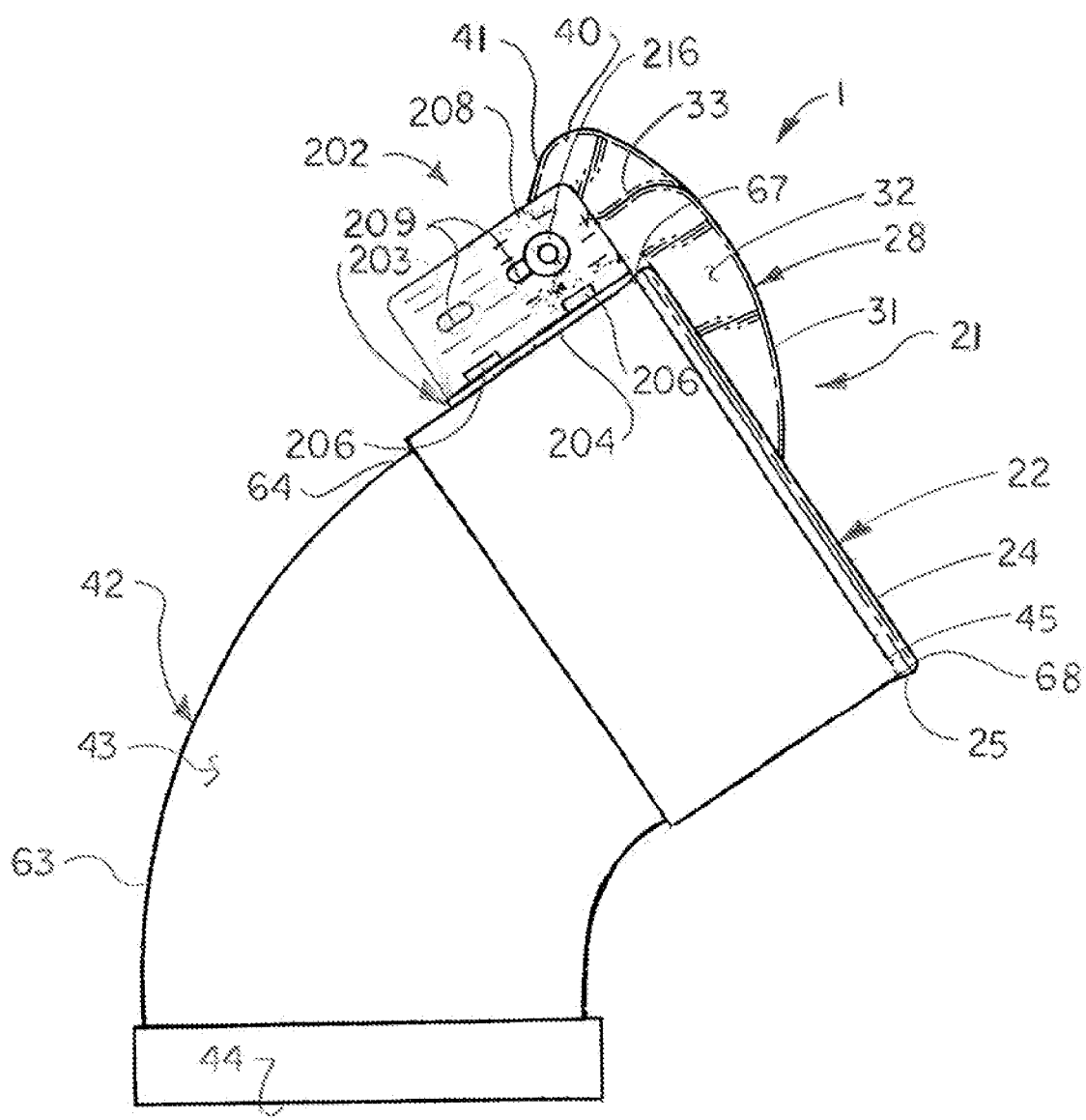
FIG. 22 a right-side view of the illustrative cleanout conduit valve assembly, mounted on a valve housing via an alternative valve mount in typical installation and application of the cleanout conduit valve assemblies.
Figure 23:
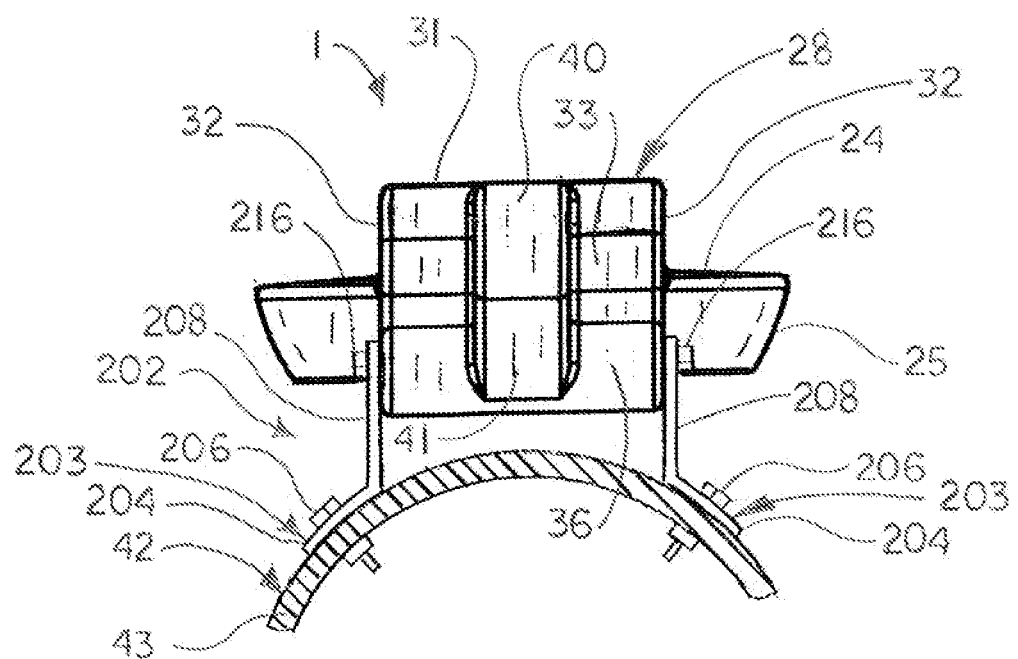
FIG. 23 is a rear view of the valve housing, valve mount and valve illustrated in FIG. 22.

Referring next to FIGS. 22 and 23 of the drawings, an alternative valve mount 202 which is suitable for mounting the valve 21 on the valve housing 42 of the valve assembly 1 is illustrated. The valve mount 202 may include a pair of valve mount brackets 203. The valve mount brackets 203 may be attached to the valve housing wall 43 of the valve housing 42 in spaced-part relationship to each other at the upper discharge opening side 67 of the valve discharge end 45. The valve hinge portion 36 (FIG. 23) of the valve arm 28 on the valve 21 may be pivotally mounted between the valve mount brackets 203 typically as will be hereinafter described.

Each valve mount bracket 203 may include a bracket base plate 204. The bracket base plate 204 may be attached to the valve housing wall 43 of the valve housing 42 using any suitable technique known by those skilled in the art. In some embodiments, at least one bracket fastener 206 may be used for the purpose. In other embodiments, bands, clamps, brackets and/or other suitable technique or techniques may be used for the purpose. As illustrated in FIG. 23, in some embodiments, the bracket base plate 204 of each valve mount bracket 203 may be curved to match the curvature of the exterior surface of the valve housing wall 43.

A hinge plate 208 may extend from the bracket base plate 204. As illustrated in FIG. 23, the hinge plates 208 of the respective valve mount brackets 203 may extend in parallel, spaced-apart relationship to each other.

At least one pair of typically slotted valve mount apertures 209 may extend through the respective hinge plates 208 of the valve mount bracket 203. The valve hinge portion 36 on the valve arm 28 of the valve 21 may be pivotally mounted between the hinge plates 208 of the valve mount brackets 203 typically by extending the valve mount rod 14 (FIG. 4) through the rod opening 37 (FIGS. 9-12) in the valve hinge portion 36 and through the pair of registering, typically slotted valve mount apertures 209 (FIG. 22) in the respective hinge plates 208. A pair of valve mount rod fasteners 216 may be threaded on the respective rod studs 15 (FIG. 4) on the valve mount rod 14 and against the hinge plates 208 to secure the valve hinge portion 36 on the valve mount rod 14 between the hinge plates 208. Accordingly, the valve 21 may be positional between the closed valve position (FIG. 22) and the full open valve position (FIG. 21), typically as was heretofore described with respect to FIGS. 17-21. In the closed valve position, the valve 21 may rest on and sealingly engage with the valve engaging surface 46 at the valve discharge end 45 of the valve housing 42, entirely or solely by the weight of the valve 21.

In some embodiments, two pairs of the valve mount apertures 209 may extend through the respective hinge plates 208. Accordingly, either valve mount bracket 203 may be used as the left or right valve mount bracket in installation of the valve 21 on the valve mount bracket 203.

In typical application, the valve assembly 1 with the valve mount 202 may be installed and operated in the cleanout housing interior 74 (FIG. 25) of the cleanout housing 70 in the cleanout conduit installation 50 which was heretofore described with respect to FIGS. 24-26 or in the two-way cleanout conduit installation 150 which was heretofore described with respect to FIGS. 27 and 28. It will be appreciated by those skilled in the art that the valve assembly 1 can be easily accessed through the cleanout conduit opening 73 of the cleanout housing 70 for replacement, repair and/or maintenance typically by opening the cleanout housing door 75.

While certain illustrative embodiments of the disclosure have been described above, it will be recognized and understood that various modifications can be made to the embodiments and the appended claims are intended to cover all such modifications which may fall within the spirit and scope of the disclosure.

What is claimed is:

1. A cleanout conduit valve installation for at least one cleanout conduit extending into a subterranean cleanout conduit hole and connected to a sewer service line, comprising:
   at least one cleanout housing having a cleanout housing interior and configure for placement in the cleanout conduit hole with the at least one cleanout conduit extending into the cleanout housing interior, a cleanout housing opening overlying the cleanout housing interior and an openable cleanout housing door disposed in the cleanout housing opening;
   at least one cleanout conduit valve assembly configured to be disposed in fluid communication with the at least one cleanout conduit in the cleanout housing interior of the at least one cleanout housing, the at least one cleanout conduit valve assembly including:
      a valve housing configured for mounting on the at least one cleanout conduit;
      a valve mount carried by the valve housing; and
      a valve including:
         a valve arm pivotally carried by the valve mount at a pivot point;
         a valve stop extending from the valve arm; and
         a valve body carried by the valve arm, the valve body having a sealing surface; and
         the valve positional between a closed valve position configured to seal the valve housing and a full open valve position configured to unseal the valve housing; and
      the valve stop engaging the valve body in the full open valve position; and
      wherein the valve body has a valve center of mass exterior to the pivot point, whereby the valve is self-standing in the fully open valve position.

2. The cleanout conduit valve installation of claim 1 wherein the valve mount comprises a pair of spaced-apart hinge plates carried by the valve housing, and wherein the valve arm of the valve is pivotally carried by the hinge plates.

3. The cleanout conduit valve installation of claim 2 further comprising a valve mount rod extending between the hinge plates, and wherein the valve arm of the valve pivotally interfaces with the valve mount rod.

4. The cleanout conduit valve installation of claim 3 further comprising a pair of valve mount apertures in the hinge plates, respectively, and wherein the valve mount rod extends through the valve mount apertures.

5. The cleanout conduit valve installation of claim 4 wherein the pair of valve mount apertures composes a pair of elongated, slotted valve mount apertures, and the valve mount rod is capable of tilting between the hinge plates by traversing the slotted valve mount apertures.

6. The cleanout conduit valve installation of claim 4 further comprising a valve hinge portion extending from the valve arm and a rod opening extending through the valve hinge portion, and wherein the valve mount rod extends through the rod opening.

7. The cleanout conduit valve installation of claim 1 wherein the valve body of the valve extends through the cleanout housing opening of the at least one cleanout housing in the full open valve position of the valve.

8. The cleanout conduit valve installation of claim 1 wherein the sealing surface of the valve body is convex in cross-section.

9. The cleanout conduit valve installation of claim 8 wherein the valve housing comprises a valve engaging surface convex in cross-section, and wherein the sealing surface of the valve body engages the valve engaging surface in the closed valve position.

10. The cleanout conduit valve installation of claim 1 wherein the valve stop comprises a flat or planar valve stop surface disposed at an acute stop angle with respect to a valve body plane of the valve body.

11. The cleanout conduit valve installation of claim 9 wherein the stop angle is 45 degrees.

12. The cleanout conduit valve installation of claim 1 wherein the valve body comprises an interior valve body surface and an exterior valve body surface, the sealing surface extending between the interior valve body surface and the exterior valve body surface, and wherein the valve arm comprises a front arm edge extending along the exterior valve body surface of the valve body, a pair of flat or planar side arm surfaces extending from the front arm edge and from the exterior body surface, a convex upper arm surface extending from the front arm edge along the side arm surfaces and a rear arm surface extending from the upper arm surface, and the valve stop extends from the rear arm surface.

13. A cleanout conduit valve installation for at least one cleanout conduit extending into a subterranean cleanout conduit hole and connected to a sewer service line, comprising:
   at least one cleanout housing having as cleanout housing interior and configured for placement in the cleanout conduit hole with the at least one cleanout conduit extending into the cleanout housing interior, a cleanout housing opening overlying the cleanout housing interior and an openable cleanout housing door disposed in the cleanout housing opening;
   at least one cleanout conduit valve assembly configured to be disposed in fluid communication with the at least one cleanout conduit, the at least one cleanout conduit valve assembly including:
      a vertically oriented valve housing configured for coupling to the at least one cleanout conduit, the valve housing having:
         a valve inlet end; and
         a valve discharge end opposite to and generally above the valve inlet end, the valve discharge end oriented within a valve discharge plane disposed at a discharge angle with respect to a horizontal plane and having an upper discharge opening side and a lower discharge opening side sloped downwardly from the upper discharge opening side;
      a valve mount carried by the valve housing at the upper discharge opening side of the valve discharge end of the valve housing; and
      a valve pivotally carried by the valve mount at a pivot point and configurable between a closed valve position sealing the valve housing and a full open valve position unsealing the valve housing, the valve including:
         a valve arm pivotally carried by the valve mount;
         a valve stop extending from the valve arm, the valve stop engaging the valve housing in the full open valve position; and
         a valve body extending from the valve arm, the valve body including:
            an interior valve body surface;

an exterior valve body surface; and
a sealing surface extending from the interior valve body surface to the exterior valve body surface, the sealing surface engaging the valve housing in the closed valve position; and
wherein the valve body has a valve center of mass exterior to the pivot point, whereby the valve is self-standing in the fully open valve position.

14. The cleanout conduit valve installation of claim 13 wherein the valve mount comprises a pair of spaced-apart hinge plates and a valve mount rod extending between the hinge plates, and wherein the valve arm of the valve pivotally interfaces with the valve mount rod.

15. The cleanout conduit valve installation of claim 14 further comprising a valve hinge portion extending from the valve arm of the valve and a rod opening extending through the valve hinge portion, and wherein the valve mount rod of the valve hinge extends through the rod opening.

16. The cleanout conduit valve installation of claim 13 wherein the sealing surface of the valve body is convex in cross-section.

17. The cleanout conduit valve installation of claim 13 wherein the valve stop comprises a flat or planar valve stop surface disposed at a stop angle of substantially 45 degrees with respect to a valve body plane of the valve body.

18. The cleanout conduit valve installation of claim 13 wherein the valve body of the valve extends through the cleanout housing opening of the at least one cleanout housing in the full open valve position of the valve.

19. A cleanout conduit valve installation for at least one cleanout conduit extending into a subterranean cleanout conduit hole and connected to a sewer service line, comprising:
  at least one cleanout housing having a cleanout housing interior and configured for placement in the cleanout conduit hole with the at least one cleanout conduit extending into the cleanout housing interior, a cleanout housing opening overlying the cleanout housing interior and an openable cleanout housing door disposed in the cleanout housing opening;
  at least one cleanout conduit valve assembly configured for placement in fluid communication with the at least one cleanout conduit, including:
    a valve housing configured for coupling to the at least one cleanout conduit, the valve housing having a valve engaging surface convex in cross-section, the valve housing having:
      a valve inlet end; and
      a valve discharge end opposite to and generally above the valve inlet end, the valve discharge end oriented within a valve discharge plane disposed at a discharge angle of about 45 degrees with respect to a horizontal plane and having an upper discharge opening side and a lower discharge opening side sloped downwardly from the upper discharge opening side;
    a valve mount carried by the valve mount at the upper discharge opening side of the valve discharge end of the valve housing, the valve mount including:
      a pair of spaced-apart hinge plates carried by the valve housing;
      a pair of elongated, slotted valve mount apertures in the hinge plates, respectively; and
      a valve mount rod extending through the slotted valve mount apertures and between the hinge plates, the valve mount rod capable of tilting between the hinge plates by traversing the slotted valve mount apertures; and
    a valve pivotally carried by the valve mount rod of the valve mount at a pivot point and configurable between a closed valve position sealing the valve housing and a full open valve position unsealing the valve housing, the valve including:
      a valve arm pivotally carried by the valve mount rod at the pivot point;
      a valve stop extending from the valve arm, the valve stop having a flat or planar valve stop surface engaging the valve housing in the fully open valve position; and
      a valve body extending from the valve arm, the valve body including:
        an interior valve body surface;
        an exterior valve body surface; and
        a sealing surface extending from the interior valve body surface to the exterior valve body surface, the sealing surface convex in cross-section and sealingly engaging the valve engaging surface of the valve housing in the closed valve position:
      wherein the valve stop surface is disposed at a stop angle of substantially 45 degrees with respect to a valve body plane of the valve body;
      wherein the valve body has a valve center of mass exterior to the pivot point, whereby the valve is self-standing in the fully open valve position; and
      wherein the valve body of the valve extends through the cleanout housing opening of the at least one cleanout housing in the full open valve position of the valve.

20. A cleanout conduit valve installation for at least one cleanout conduit extending into a subterranean cleanout conduit hole and connected to a sewer service line, comprising:
  at least one cleanout housing having a cleanout housing interior and configured for placement in the cleanout conduit hole with the at least one cleanout conduit extending into the cleanout housing interior, a cleanout housing opening overlying the cleanout housing interior and an openable cleanout housing door disposed in the cleanout housing opening;
  at one cleanout conduit valve assembly configured to be disposed in fluid communication with the at least one cleanout conduit in the cleanout housing interior of the at least one cleanout housing, the at least one cleanout conduit valve assembly including:
    a valve housing configured for mounting on the at least one cleanout conduit;
    valve mount carried by the valve housing, the valve mount comprising:
      a pair of spaced-apart hinge plates carried by the valve housing;
      a pair of vertically elongated, slotted valve mount apertures in the hinge plates, respectively;
      a valve mount rod extending through the valve mount apertures; and
    a valve including:
      a valve arm pivotally carried by the valve mount rod of the valve mount;
      a valve stop extending from the valve arm; and
      a valve body carried by the valve arm, the valve body having a sealing surface; and the valve positional between a closed valve position configured to seal the valve housing and a full open valve position configured to unseal the valve housing; and the valve stop engaging the valve body in the full open valve position; and whereby the valve mount rod of the valve mount is shiftable vertically within the valve mount apertures in the hinge plates, respectively, to vertically tilt the valve mount rod and the valve.

* * * * *